United States Patent
Cha et al.

(10) Patent No.: US 9,429,357 B2
(45) Date of Patent: Aug. 30, 2016

(54) REFRIGERATOR AND MANUFACTURING METHOD THEREOF

(71) Applicant: SAMSUNG ELECTRONICS CO., LTD., Suwon-si (KR)

(72) Inventors: Kwang Hyuk Cha, Gwangju-si (KR); Ho Sang Park, Gwangju (KR); Kwon Chul Yun, Gwangju (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 140 days.

(21) Appl. No.: 13/939,662

(22) Filed: Jul. 11, 2013

(65) Prior Publication Data
US 2014/0015394 A1   Jan. 16, 2014

(30) Foreign Application Priority Data
Jul. 12, 2012  (KR) .................. 10-2012-0075903

(51) Int. Cl.
*A47B 96/04*   (2006.01)
*F25D 23/06*   (2006.01)
(Continued)

(52) U.S. Cl.
CPC ............ *F25D 23/063* (2013.01); *B23P 15/26* (2013.01); *F25D 11/02* (2013.01); *F25D 23/00* (2013.01); *F25D 23/064* (2013.01); *F25D 23/066* (2013.01); *F25D 2201/12* (2013.01); *F25D 2323/021* (2013.01); *F25D 2400/04* (2013.01);
(Continued)

(58) Field of Classification Search
CPC ............... F25D 23/00; F25D 23/064; F25D 2323/021; F25D 2400/04; F25D 2400/06; A47B 47/042; A47B 57/58; A47B 57/10; A47B 87/0246; Y10T 29/49357; B23P 15/26
USPC ......... 312/401, 402, 404, 406, 406.1, 406.2, 312/330.1, 407, 407.1
See application file for complete search history.

(56) References Cited

U.S. PATENT DOCUMENTS 1,684,549 A * 9/1928 Lucke ........................... 264/219
3,872,688 A * 3/1975 Tillman ......................... 62/329
(Continued)

FOREIGN PATENT DOCUMENTS

| JP | 2000-88448 | 3/2000 |
|---|---|---|
| JP | 2000-304431 | 11/2000 |

(Continued)

OTHER PUBLICATIONS

International Search Report mailed Sep. 13, 2013 in corresponding International Application No. PCT/KR2013/006173.
(Continued)

*Primary Examiner* — Daniel J Troy
*Assistant Examiner* — Timothy M Ayres
(74) *Attorney, Agent, or Firm* — Staas & Halsey LLP

(57) ABSTRACT

A refrigerator and a manufacturing method thereof including processes of separately manufacturing partitions dividing a storage space into a plurality of storage chambers from a main body including an inner casing and an outer casing, coupling the partitions to an inner surface of the inner casing, filling a space between the inner casing and the partitions with an insulator, and filling the partitions with the insulator by filling a space between the inner casing and the outer casing with the insulator. Since the insulator uniformly fills the partitions dividing the storage space into the plurality of storage chambers, the partitions may possess improved insulating qualities.

20 Claims, 11 Drawing Sheets

(51) Int. Cl.
 B23P 15/26 (2006.01)
 F25D 23/00 (2006.01)
 F25D 11/02 (2006.01)

(52) U.S. Cl.
 CPC ...... *F25D 2400/06* (2013.01); *Y10T 29/49357* (2015.01)

(56) References Cited

U.S. PATENT DOCUMENTS

| | | | | |
|---|---|---|---|---|
| 4,043,624 | A | * | 8/1977 | Lindenschmidt ............. 312/406 |
| 4,067,628 | A | * | 1/1978 | Sherburn ...................... 312/407 |
| 4,191,434 | A | * | 3/1980 | Powell et al. ................ 312/407 |
| 4,771,532 | A | * | 9/1988 | Taylor, Jr. et al. .......... 29/455.1 |
| 6,460,955 | B1 | * | 10/2002 | Vaughan et al. ............. 312/401 |
| 7,316,125 | B2 | * | 1/2008 | Uekado et al. ................ 62/440 |
| 2006/0152119 | A1 | * | 7/2006 | Park .............................. 312/404 |
| 2007/0085457 | A1 | * | 4/2007 | Park et al. ................... 312/402 |
| 2007/0228907 | A1 | * | 10/2007 | Luisi et al. ................... 312/404 |
| 2009/0013710 | A1 | * | 1/2009 | Cho et al. ...................... 62/285 |

FOREIGN PATENT DOCUMENTS

| | | |
|---|---|---|
| JP | 2001-108359 | 4/2001 |
| JP | 2003-021448 | 1/2003 |
| JP | 3847112 | 11/2006 |
| JP | 2009-115368 | 5/2009 |
| JP | 2011-153721 | 8/2011 |
| KR | 1995-0009190 | 4/1995 |
| KR | 20-1999-012951 | 4/1999 |
| KR | 1999-012951 | 4/1999 |
| KR | 10-2011-0056890 | 5/2011 |
| WO | WO 2007/015318 | * 2/2007 |

OTHER PUBLICATIONS

Korean Office Action dated Sep. 1, 2015 from Korean Patent Application No. 10-2012-0075903, 15 pages.
U.S. Office Action dated Mar. 11, 2016 in U.S. Appl. No. 14/973,041.
U.S. Office Action dated Mar. 21, 2016 in U.S. Appl. No. 14/973,041.

* cited by examiner

REFRIGERATOR AND MANUFACTURING METHOD THEREOF

CROSS-REFERENCE TO RELATED APPLICATIONS

This application claims the priority benefit of Korean Patent Application No. 10-2012-0075903, filed on Jul. 12, 2012 in the Korean Intellectual Property Office, the disclosure of which is incorporated herein by reference.

BACKGROUND

1. Field

Embodiments of the present disclosure relate to a refrigerator equipped with a plurality of storage chambers divided by partitions and a manufacturing method of the refrigerator.

2. Description of the Related Art

In general, a refrigerator is an appliance which is used to keep foods in a fresh state and is provided with storage chambers and a cold air supply device to supply cold air to the storage chambers.

A temperature of the storage chambers is maintained within a range required to keep foods in a fresh state.

The storage chambers have an opened front portion, and the opened front portion of the storage chambers is usually in a closed state by a door in order to maintain the temperature of the storage chambers.

The storage chambers are defined by an inner casing, and the inner casing is coupled with an outer casing to define an appearance of a refrigerator. An insulator fills a space between the inner casing and the outer casing in order to prevent outflow of cold air.

The storage chambers are divided by partitions which are integrally formed at the inner casing. When the insulator fills the space between the inner casing and the outer casing, the insulator also fills the partitions.

However, as refrigerators have gradually increased in size, the partitions are increased in size. Therefore, when the insulator fills the space between the inner casing and the outer casing, the insulator may not uniformly fill the partitions.

SUMMARY

It is an aspect of the present disclosure to provide a refrigerator and a manufacturing method thereof including processes of separately manufacturing partitions dividing a storage space into a plurality of storage chambers from a main body including an inner casing and an outer casing, coupling the partitions to an inner surface of the inner casing, filling a space between the inner casing and the partitions with an insulator, and filling the partitions with the insulator by filling a space between the inner casing and the outer casing with the insulator.

Additional aspects of the disclosure will be set forth in part in the description which follows and, in part, will be apparent from the description, or may be learned by practice of the disclosure.

In accordance with one aspect of the present disclosure, a refrigerator including a storage space having an opened front portion and partitions coupled to an inner surface of the storage space to divide the storage space into a plurality of storage chambers, further includes an inner casing having the storage space defined thereby, and including a plurality of side walls, a rear wall and a bottom wall respectively formed with coupling recesses to which the partitions are coupled, an outer casing coupled to the inner casing to define an appearance of the refrigerator, and an insulator filling a space between the inner casing and the outer casing. The partitions include a first partition horizontally coupled to the plurality of side walls and the rear wall of the inner casing to divide the storage space into an upper storage chamber and a lower storage chamber, and a second partition vertically coupled to a bottom surface of the first partition and the bottom wall of the inner casing to divide the lower storage chamber into a left chamber and a right chamber. The insulator fills the first partition separately from the insulator filling the space between the inner casing and the outer casing. The second partition communicates with the first partition so that the insulator fills the second partition.

The coupling recesses may include a first coupling recess formed at the plurality of side walls, a second coupling recess formed at the rear wall, and a third coupling recess formed at the bottom wall of the inner casing. The first coupling recess and the second coupling recess may have a length corresponding to a horizontal length of the plurality of side walls and the rear wall of the inner casing, respectively, and the third coupling recess may have a length corresponding to a horizontal length of a portion of the bottom wall of the inner casing other than a portion occupied by a machine room covers.

The first partition may include a plurality of side surfaces which are slanted in a substantially inverted-trapezoidal shape, and the first coupling recess may have a shape corresponding to the shape of the plurality of side surfaces of the first partition.

The first partition may include a rear surface which extends vertically, the second partition may include a bottom surface which extends horizontally, and the second coupling recess and the third coupling recess may have a shape corresponding to the shape of the rear surface of the first partition and the bottom surface of the second partition, respectively.

The first partition may include a lower plate, an upper plate coupled to the lower plate, a prefabricated insulator disposed between the lower plate and the upper plate, and a reinforcing frame coupled between the lower plate and the upper plate to reinforce the first partition.

The lower plate may be provided with a coupling part to which the second partition is coupled, and the coupling part may be formed with communication holes communicating with the second partition so that the insulator filling the first partition moves into the second partition and fills the same.

The reinforcing frame may be provided with support parts at both end portions thereof, which extend toward a space between the upper plate and the lower plate, and the prefabricated insulator may include a plurality of side surfaces at a front portion thereof, which have a shape corresponding to a shape of the support parts of the reinforcing frame so as to provide a space to accommodate the support parts between the upper plate and the lower plate.

The prefabricated insulator may be formed with guide paths at a bottom surface thereof, and the guide paths may include a first guide path to guide the insulator filling the first partition to the communication holes of the coupling part so that the insulator fills the second partition, and second guide paths to guide the insulator filling the first partition to supplementary filling holes formed at the plurality of side surfaces of the front portion of the prefabricated insulator so that the insulator fills the inner space of the first partition.

The first partition may be formed with an opening at the rear surface thereof, through which the insulator fills the first partition, and the opening may communicate with the guide paths.

The second coupling recess formed at the inner casing may be formed with first filling holes, and the insulator may fill the first partition through the first filling holes and the opening.

The first coupling recess, the second coupling recess and the third coupling recess may be formed with second filling holes, through which the insulator fills a space between the first, second and third coupling recesses and the first partition.

The second partition may include a left plate, a right plate coupled to the left plate, a hot pipe support part coupled between the left plate and the right plate to support a hot pipe and maintain a gap between the left plate and the right plate, and a cover coupled to a front surface of the hot pipe support part.

The second partition may be formed with an opening at a top surface thereof, and the opening of the second partition may communicate with the communication holes so that the insulator fills the second partition therethrough.

The left plate and the right plate may be adhered to each other by the insulator filling a space therebetween through the opening.

In accordance with another aspect of the present disclosure, a refrigerator includes a main body, a storage space formed in the main body and having an opened front portion, and partitions coupled to an inner surface of the storage space to divide the storage space into a plurality of storage chambers. The partitions include a first partition horizontally coupled to the storage space to divide the storage space into an upper storage chamber and a lower storage chamber, and a second partition vertically coupled to a bottom surface of the first partition and the storage space to divide the lower storage chamber into a left chamber and a right chamber. The partitions are filled with an insulator which fills the main body after being coupled to the storage space.

The main body may include an inner casing defining the storage space and an outer casing coupled to the inner casing to define an appearance of the refrigerator, and the insulator may fill a space between the inner casing and the outer casing.

The inner casing may include a plurality of side walls, a rear wall and a bottom wall respectively formed with coupling recesses to which the partitions are coupled. The coupling recesses may include a first coupling recess formed at the plurality of side walls, a second coupling recess formed at the rear wall, and a third coupling recess formed at the bottom wall of the inner casing. The first coupling recess and the second coupling recess may have a length corresponding to a horizontal length of the plurality of side walls and the rear wall of the inner casing, respectively, and the third coupling recess may have a length corresponding to a horizontal length of a portion of the bottom wall of the inner casing other than a portion occupied by a machine room covers.

The first partition may include a plurality of side surfaces which are slanted in a substantially inverted-trapezoidal shape, and the first coupling recess may have a shape corresponding to the shape of the plurality of side surfaces of the first partition.

The first partition may include a lower plate, an upper plate coupled to the lower plate, a prefabricated insulator disposed between the lower plate and the upper plate, and a reinforcing frame coupled between the lower plate and the upper plate to reinforce the first partition.

The lower plate may be provided with a coupling part to which the second partition is coupled, and the coupling part may be formed with communication holes communicating with the second partition so that the insulator filling the first partition moves into the second partition and fills the same.

The reinforcing frame may be provided with support parts at both end portions thereof, which extend toward a space between the upper plate and the lower plate, and the prefabricated insulator may include a plurality of side surfaces at a front portion thereof, which have a shape corresponding to a shape of the support parts of the reinforcing frame so as to provide a space to accommodate the support parts between the upper plate and the lower plate.

The prefabricated insulator may be formed with guide paths at a bottom surface thereof, and the guide paths may include a first guide path to guide the insulator filling the first partition to the communication holes of the coupling part so that the insulator fills the second partition, and second guide paths to guide the insulator filling the first partition to supplementary filling holes formed at the plurality of side surfaces of the front portion of the prefabricated insulator so that the insulator fills the inner space of the first partition.

The first partition may be formed with an opening at the rear surface thereof, through which the insulator fills the first partition, and the opening may communicate with the guide paths.

The second coupling recess formed at the inner casing may be formed with first filling holes, and the insulator may fill the first partition through the first filling holes and the opening.

The first coupling recess, the second coupling recess and the third coupling recess may be formed with second filling holes, through which the insulator fills a space between the first, second and third coupling recesses and the first partition.

The second partition may include a left plate, a right plate coupled to the left plate, a hot pipe support part coupled between the left plate and the right plate to support a hot pipe and maintain a gap between the left plate and the right plate, and a cover coupled to a front surface of the hot pipe support part.

The second partition may be formed with an opening at a top surface thereof. The opening of the second partition may communicate with the communication holes so that the insulator fills the second partition therethrough. The left plate and the right plate may be adhered to each other by the insulator filling a space therebetween through the opening.

In accordance with a further aspect of the present disclosure, a manufacturing method of a refrigerator including a storage space having an opened front portion and partitions coupled to an inner surface of the storage space to divide the storage space into a plurality of storage chambers, includes preparing a main body including an inner casing and an outer casing separately from the partitions, coupling the partitions to an inner surface of the inner casing, filling a space between the inner casing and the partitions with an insulator, and filling the partitions with the insulator by filling a space between the inner casing and the outer casing with the insulator.

As is apparent from the above description, since the insulator uniformly fills the partitions dividing the storage space into the plurality of storage chambers, the partitions may possess improved insulating qualities.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
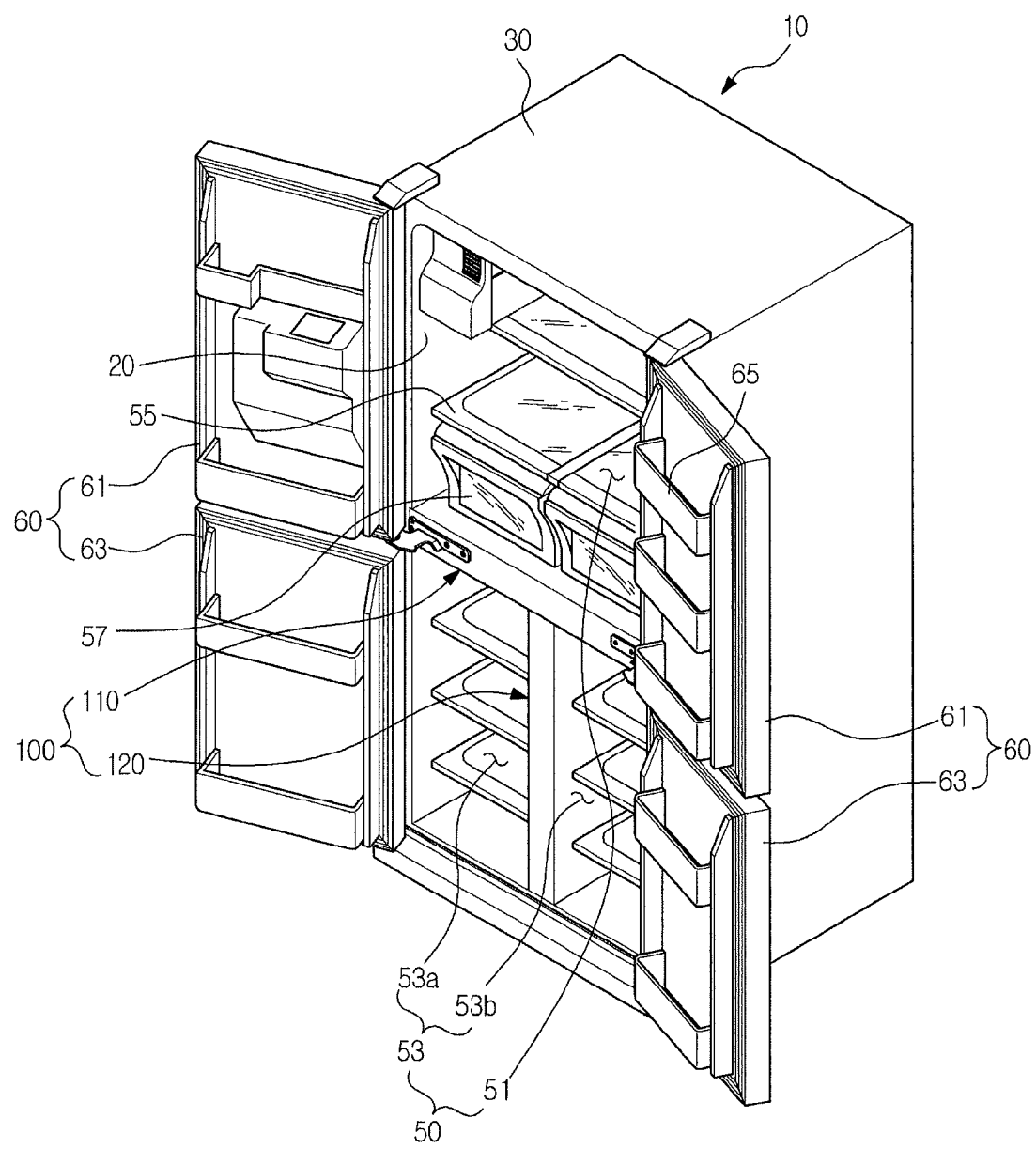
FIG. 1 is a perspective view showing a refrigerator according to an embodiment of the present disclosure.

Reference will now be made in detail to embodiments of the present disclosure, examples of which are illustrated in the accompanying drawings, wherein like reference numerals refer to like elements throughout.

Figure 2:
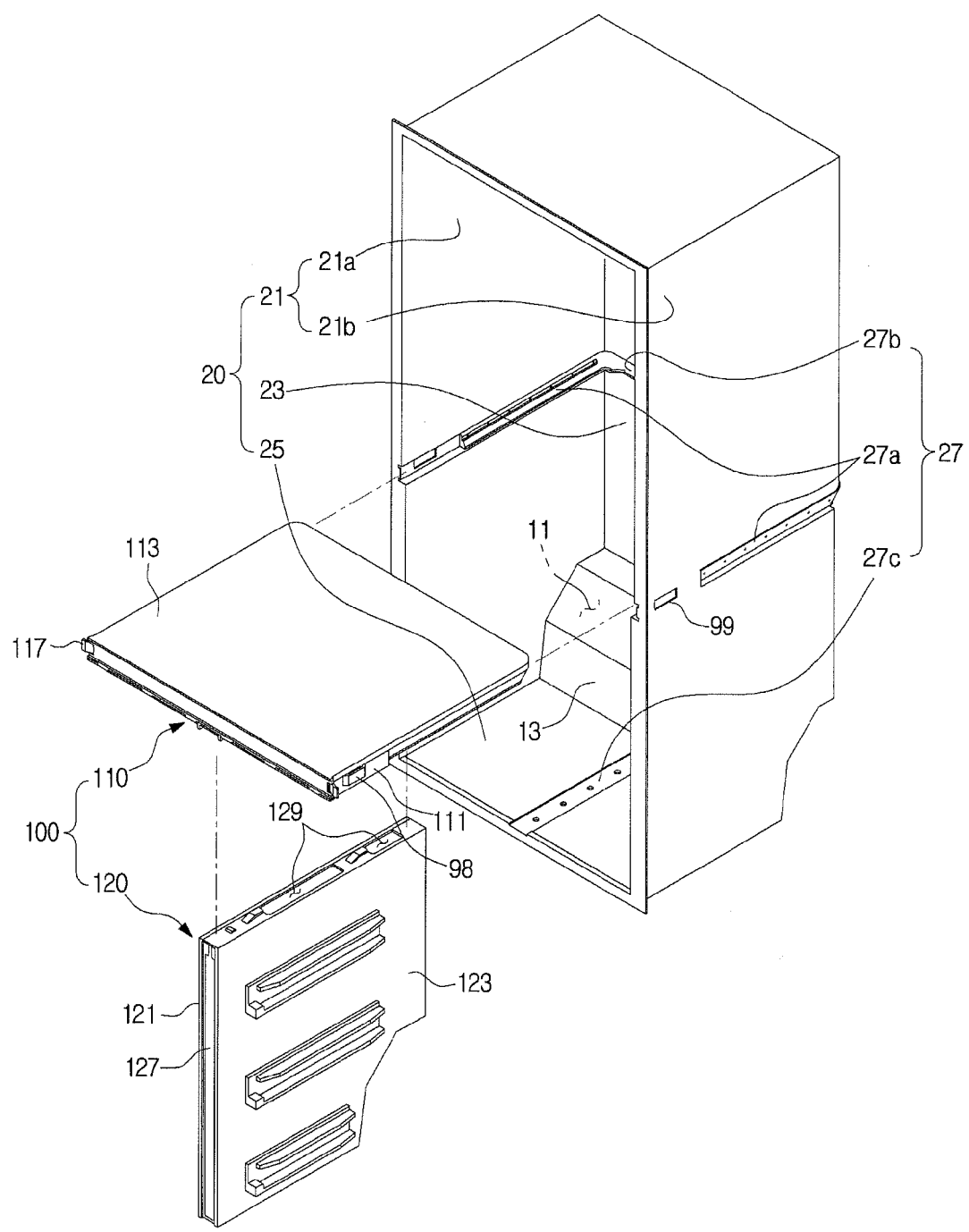
FIG. 2 is a view showing a process of coupling partitions to an inner casing in the refrigerator according to an embodiment of the present disclosure.

As shown in FIGS. 1 and 2, a refrigerator comprises a main body 10, a storage space 50 formed in the main body 10 and having an opened front portion, doors 60 hingedly coupled to the main body 10 in order to open and close the opened front portion of the storage space 50, and partitions 100 provided in the main body 10 in order to divide the storage space 50 into the plurality of storage chambers.

The main body 10 includes an inner casing 20 to define the storage space 50, and an outer casing 30 to define an appearance of the refrigerator. An insulator 40 fills a space between the inner casing 20 and the outer casing 30 in order to prevent outflow of cold air from the storage space 50.

The refrigerator further comprises a cold air supply device (not shown) to supply cold air to the storage space 50. The cold air supply device includes a compressor, a condenser, an expansion valve, an evaporator, a blowing fan and a cold air duct.

The main body 10 is formed with a machine room 11 at a rear lower portion thereof, in which the compressor to compress refrigerant and the condenser to condense the compressed refrigerant are installed.

The storage space 50 is divided into a plurality of storage chambers 51 and 53 by the partitions 100. The storage space 50 is provided with a plurality of shelves 55 and storage containers 57 thereinside to store foodstuffs. The opened front portion of the storage space 50 is opened and closed by the doors 60.

The doors 60 include upper doors 61 to open and close an upper storage chamber 51, and lower doors 63 to open and close a lower storage chamber 53. A plurality of door guards 65 may be installed on a rear portion of the doors 60 in order to provide food storage space.

Hereinafter, a constitution related to the partitions 100 to divide the storage space 50 into the plurality of storage chambers 51 and 53 will be explained.

Figure 3:
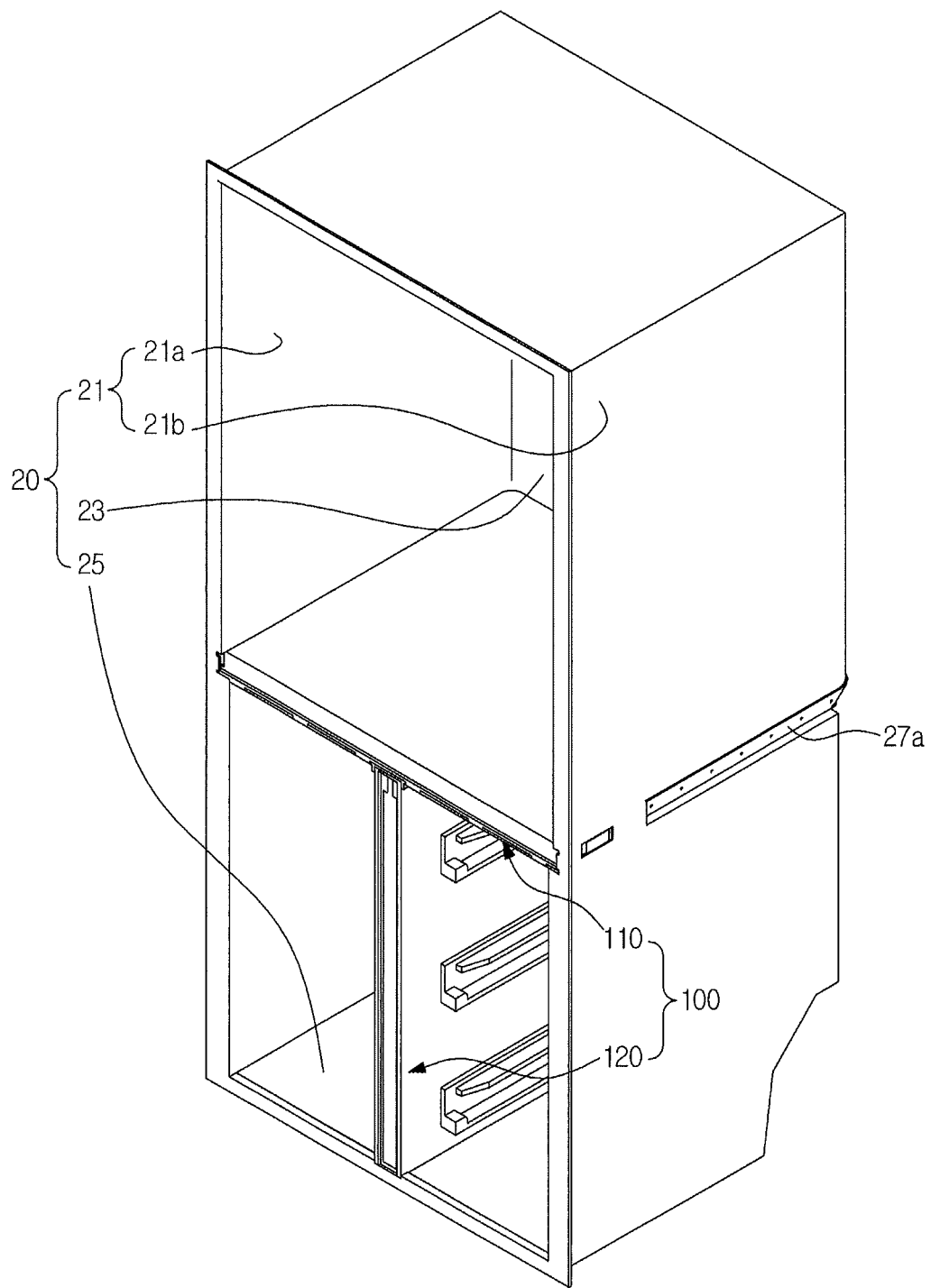
FIG. 3 is a view showing a coupled state of the partitions and the inner casing in the refrigerator according to an embodiment of the present disclosure.

Referring to FIGS. 1 through 3, the storage space 50 defined by the inner casing 20 may be divided into the plurality of storage chambers 51 and 53 by the partitions 100. The partitions 100 are manufactured separately from the inner casing 20 and the outer casing 30 and are mounted in the inner casing 20, to thereby divide the storage space 50 into the plurality of storage chambers 51 and 53.

The partitions 100 include a first partition 110 horizontally coupled to a plurality of side walls 21 and a rear wall 23 of the inner casing 20 in order to divide the storage space 50 into the upper storage chamber 51 and the lower storage chamber 53, and a second partition 120 vertically coupled to a bottom surface of the first partition 110 and a bottom wall 25 of the inner casing 20 in order to divide the lower storage chamber 53 into a left chamber 53a and a right chamber 53b.

The first partition 110 and the second partition 120 may be arranged in a T shape, to thereby divide the storage space 50 defined by the inner casing 20 into three storage chambers.

The upper storage chamber 51 may be used as a cooling chamber, the left storage chamber 53a may be used as a freezing chamber, and the right storage chamber 53b may be used as either a freezing chamber or a cooling chamber. However, division of the storage space 50 is not limited to this configuration, and the respective storage chambers 51, 53a and 53b may be used differently from the above constitution.

The plurality of side walls 21 including a left side wall 21a and a right side wall 21b, the rear wall 23 and the bottom wall 25 of the inner casing 20 are formed with coupling recesses 27, to which the partitions 100 are coupled. For example, any one of the plurality of storage chambers may be used as either a cooling chamber or freezing chamber.

The coupling recesses 27 include a first coupling recess 27a formed at the plurality of side walls 21, a second coupling recess 27b formed at the rear wall 23, and a third coupling recess 27c formed at the bottom wall 25 of the inner casing 20.

The first coupling recess 27a and the second coupling recess 27b have a length corresponding to a horizontal length of the plurality of side walls 21 and the rear wall 23 of the inner casing 20, respectively. The third coupling recess 27c has a length corresponding to a horizontal length of a portion of the bottom wall 25 of the inner casing 20 other than a portion occupied by a machine room cover 13 shielding the machine room 11.

Figure 8:
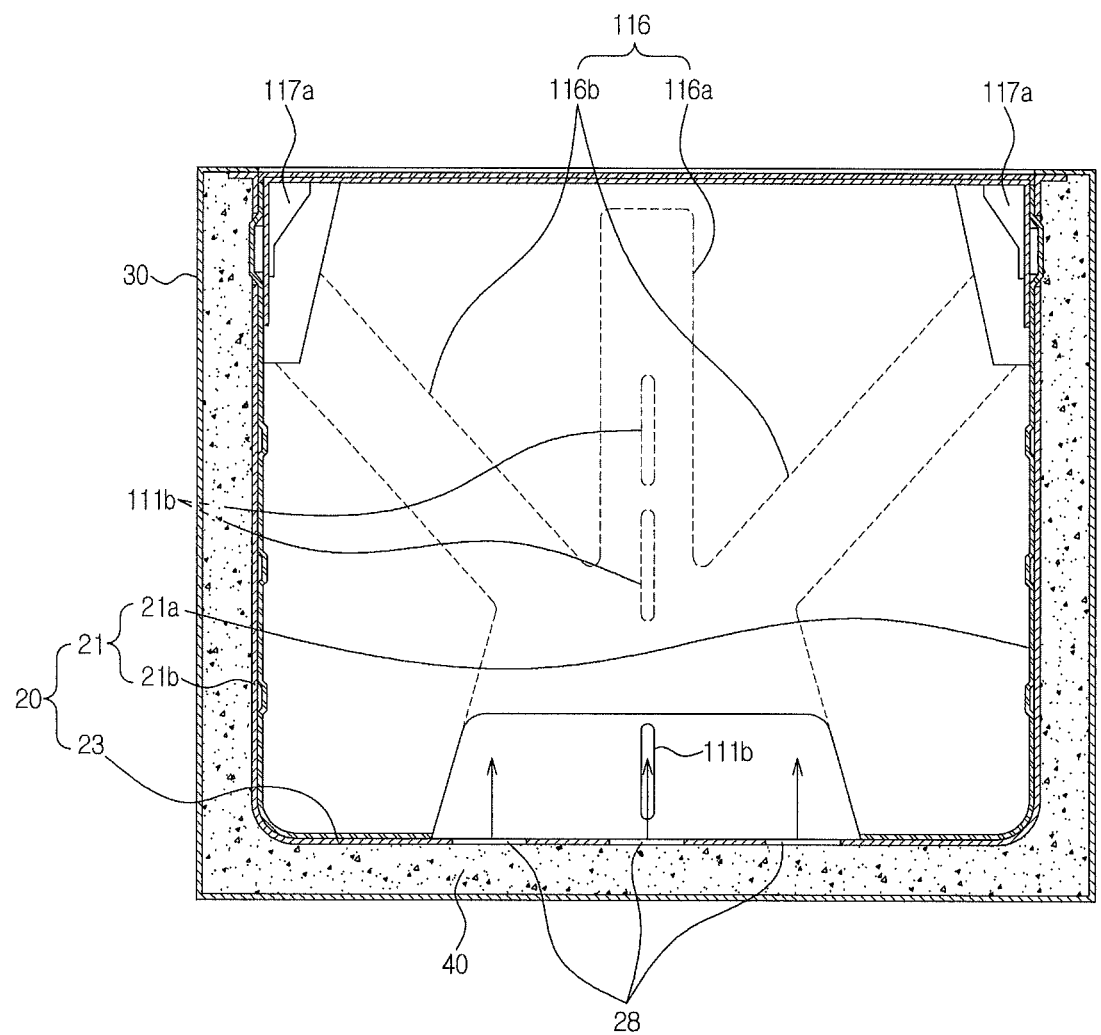
FIGS. 8 and 9 are views showing movement of an insulator in the first partition in the refrigerator according to an embodiment of the present disclosure.
Figure 9:
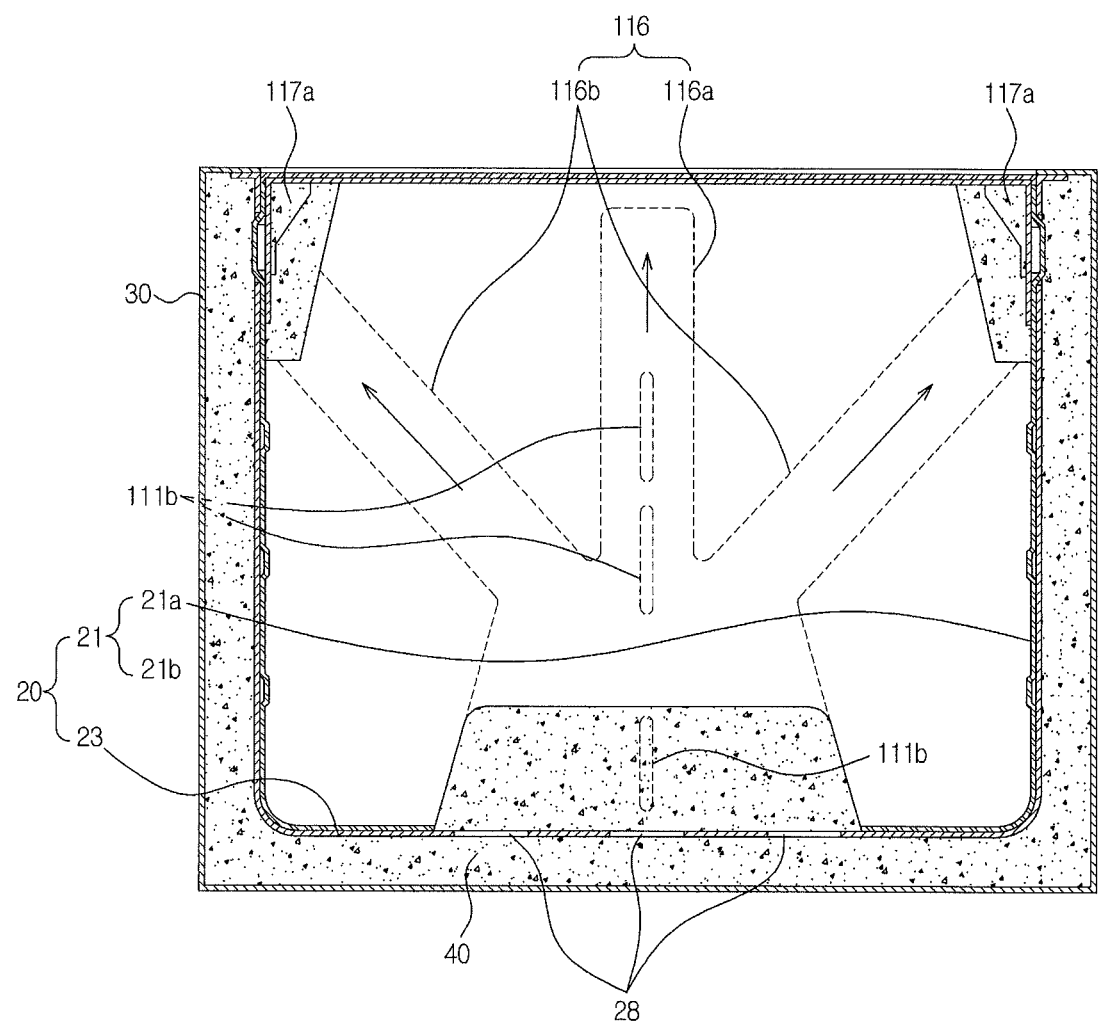

The first partition 110 is horizontally coupled to the first coupling recess 27a and the second coupling recess 27b formed at the plurality of side walls 21 and the rear walls 23 of the inner casing 20, respectively, to thereby divide the storage space 50 into the upper storage chamber 51 and the lower storage chamber 53. For example, as shown in FIG. 2, the first partition 110 may include a protrusion 98 which protrudes outwardly from a side of the first partition 110 toward one of the side walls 21a, 21b. For example, as shown in FIG. 2, the first coupling recess 27a of a side wall 21 may include an opening 99. As shown in FIGS. 3, 8, and 9, for example, the protrusion 98 of the first partition 110 may be inserted into the opening 99 of the first coupling recess 27a of the side wall 21. As shown in FIG. 2 openings are provided on both of the sidewalls 21a and 21b, and as would be understood by one of skill in the art, protrusions may be formed on both sides of the first partition 110.

The second partition 120 divides the lower storage chamber 53 into the left storage chamber 53a and the right storage chamber 53b in such a manner that a top of the second partition 120 is coupled to a bottom surface of the first partition 110 and a bottom of the second partition 120 is coupled to the third coupling recess 27c formed at the bottom wall 25 of the inner casing 20.

Figure 4:
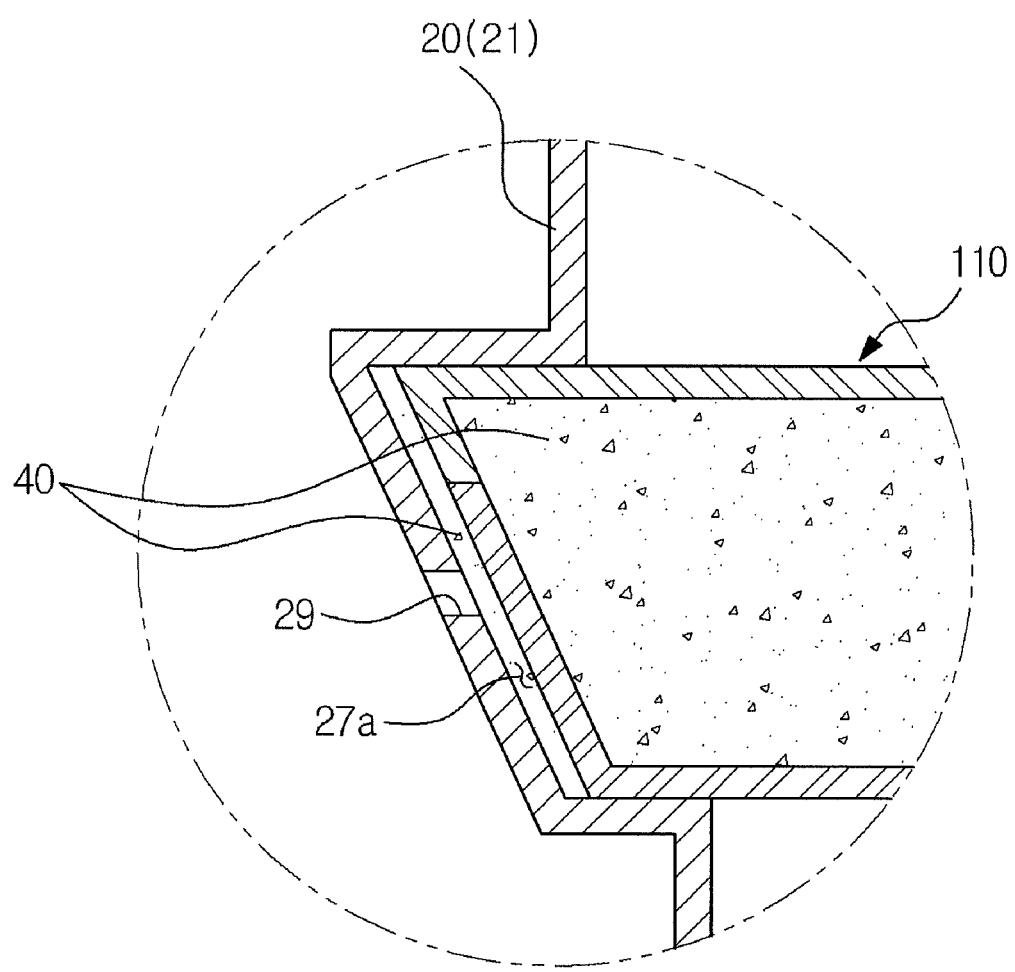
FIG. 4 is a sectional view schematically showing a coupled state of a first partition and a first coupling recess in the refrigerator according to an embodiment of the present disclosure.

As shown in FIG. 4, in order to solve defects caused by differences in insulation thickness, a plurality of side surfaces of the first partition 110 are slanted in a substantially inverted-trapezoidal shape. The first coupling recess 27a, to which the plurality of side surfaces of the first partition 110 are coupled, has a shape corresponding to the shape of the plurality of side surfaces of the first partition 110.

Figure 5:
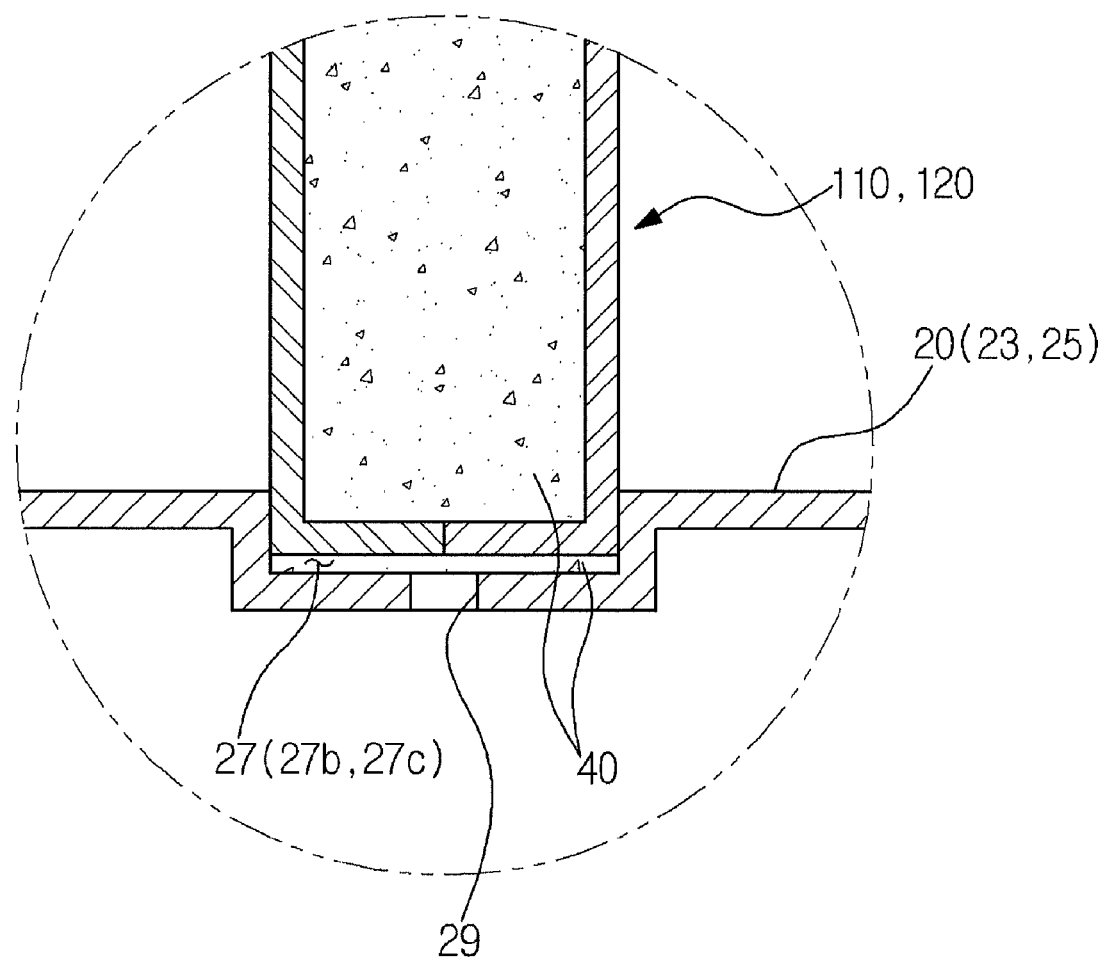
FIG. 5 is a sectional view schematically showing a coupled state of the first partition and a second coupling recess or a coupled state of a second partition and a third coupling recess in the refrigerator according to an embodiment of the present disclosure.

As shown in FIG. 5, a rear surface of the first partition 110 coupled to the second coupling recess 27b extends vertically, and a bottom surface of the second partition 120 coupled to the third coupling recess 27c extends horizontally. The second coupling recess 27b has a shape corresponding to the shape of the rear surface of the first partition 110, and the third coupling recess 27c has a shape corresponding to the shape of the bottom surface of the second partition 120.

Figure 6:
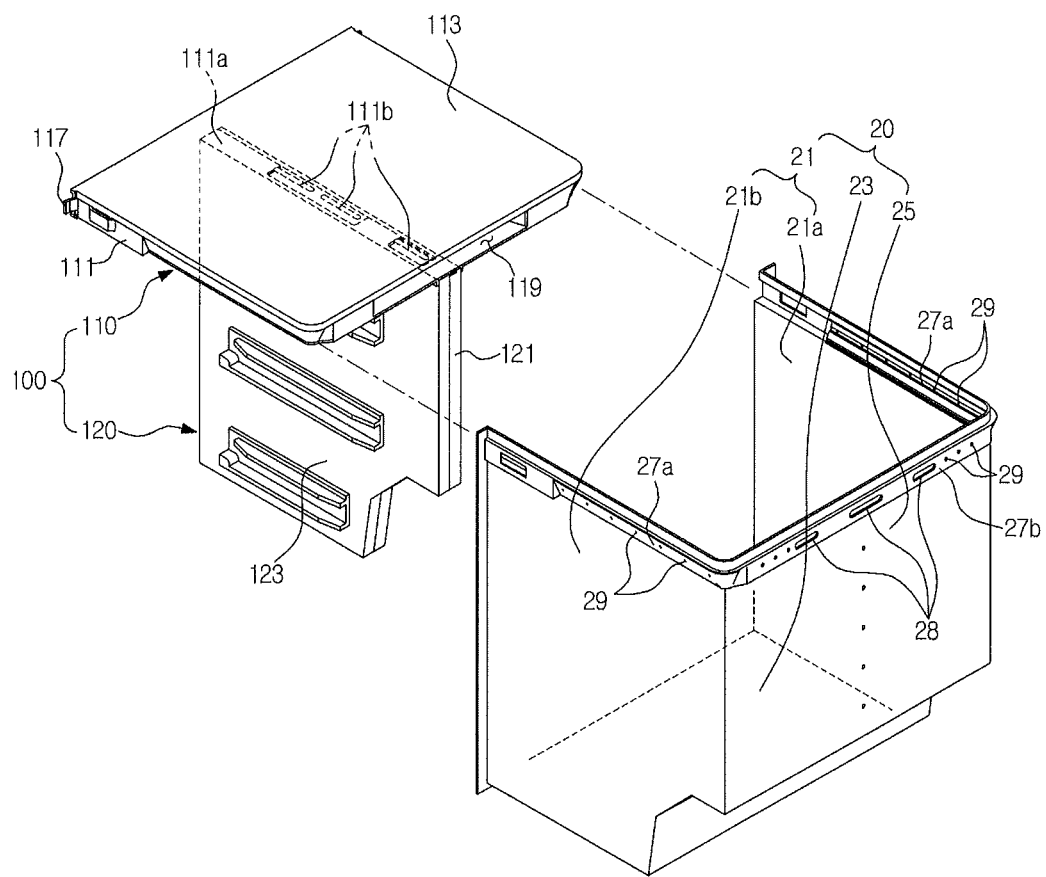
FIG. 6 is a view showing a process of coupling the partitions to the coupling recesses formed at the inner casing in the refrigerator according to an embodiment of the present disclosure.

As shown in FIG. 6, the second coupling recess 27b formed at the inner casing 20 is formed with first filling holes 28. The insulator 40 fills the first partition 110 through the first filling holes 28 and an opening 119 (which will be described later) formed at the rear surface of the first partition 110.

The first, second and third coupling recesses 27a, 27b and 27c formed at the inner casing 20 are formed with second filling holes 29, through which the insulator 40 fills a space between the first, second and third coupling recesses 27a, 27b and 27c and the first partition 110.

The insulator 40 filling a space between the inner casing 20 and the outer casing 30 also fills the first partition 110 through the first filling holes 28. However, separately from the insulator 40 filling the space between the inner casing 20 and the outer casing 30, the insulator 40 fills the space between the first, second and third coupling recesses 27a, 27b and 27c and the first partition 110.

Figure 7:
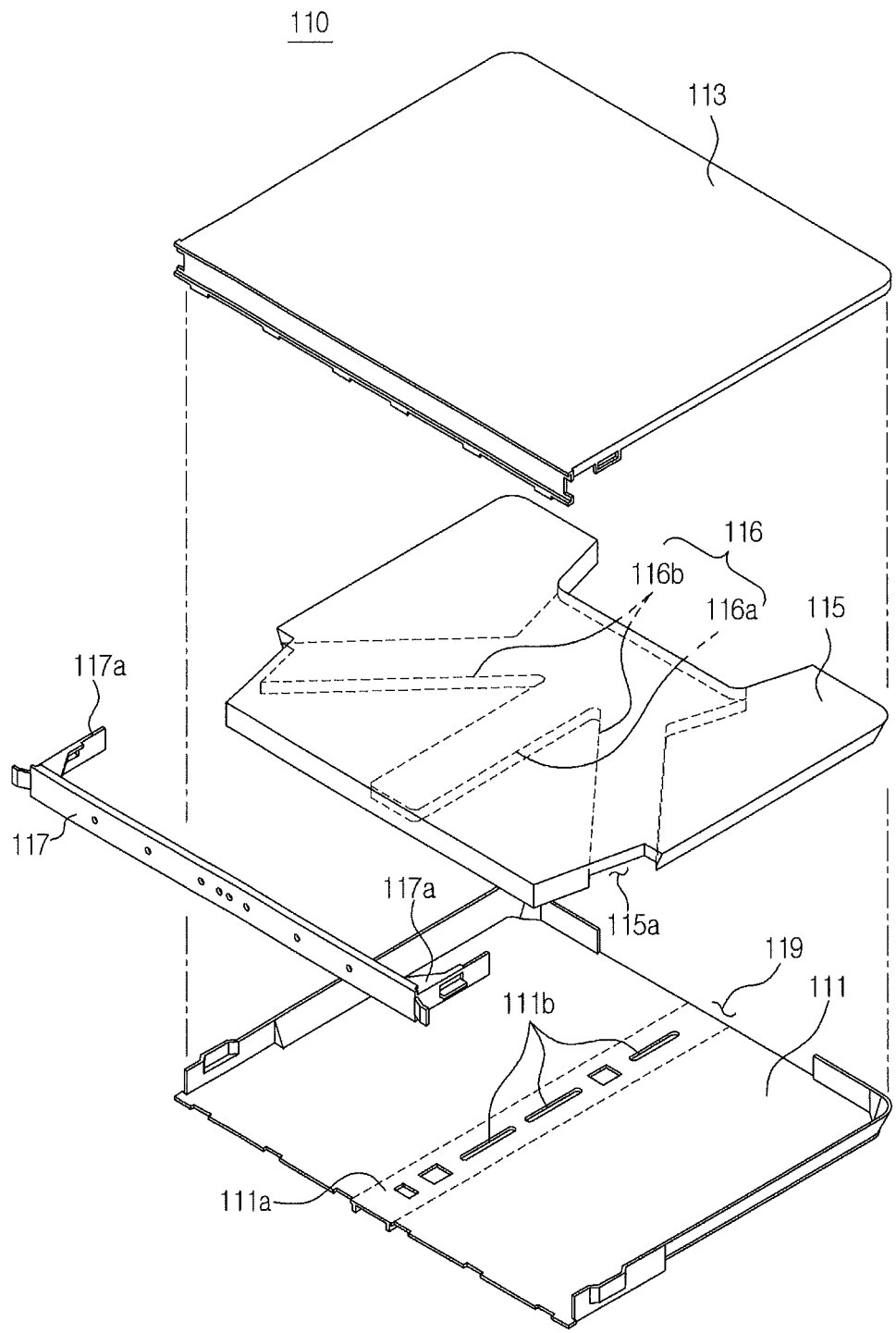
FIG. 7 is an exploded perspective view showing the first partition of the refrigerator according to an embodiment of the present disclosure.

As shown in FIGS. 7 through 9, the first partition 110 includes a lower plate 111, an upper plate 113 coupled to the lower plate 111, a prefabricated insulator 115 disposed between the lower plate 111 and the upper plate 113, and a reinforcing frame 117 coupled between the lower plate 111 and the upper plate 113 to reinforce the first partition 110.

The lower plate 111 is provided with a coupling part 111a, to which the second partition 120 is coupled. The coupling part 111a is formed with communication holes 111b communicating with the second partition 120, so that the insulator 40 filling the first partition 110 may move into the second partition 120 and fill the same. The top surface of the second partition 120 is formed with an opening 129 communicating with the communication holes 111b.

Accordingly, if the insulator 40 fills the first partition 110 through the first filling holes 28 of the inner casing 20, the insulator 40 moves from the first partition 110 into the second partition 120 through the communication holes 111b formed at the coupling part 111a of the first partition 110 and the opening 129 of the second partition 120.

The reinforcing frame 117 is provided with support parts 117a at both portions thereof, which extend toward the space between the upper plate 113 and the lower plate 111, in order to reinforce the first partition 110.

In order to provide a space to accommodate the support parts 117a of the reinforcing frame 117 between the upper plate 113 and the lower plate 111, a plurality of side surfaces of a front portion of the prefabricated insulator 115 disposed between the upper plate 113 and the lower plate 111 have a shape corresponding to the shape of the support parts 117a.

The prefabricated insulator 115 is formed with guide paths 116 at a bottom surface thereof to guide movement of the insulator 40. The guide paths 116 include a first guide path 116a to guide the insulator 40 filling the first partition 110 to the communication holes 111b of the coupling part 111a provided at the lower plate 111 so that the insulator 40 fills the second partition 120 through the opening 129 of the second partition 120, and a plurality of second guide paths 116b to guide the insulator 40 filling the first partition 110 to supplementary filling holes 115a formed at the plurality of side surfaces of the front portion of the prefabricated insulator 115 located adjacent to the support parts 117a of the reinforcing frame 117 so that the insulator 40 fills the inner space of the first partition 110.

Therefore, if the insulator 40 fills the first partition 110 through the first filling holes 28 of the inner casing 20, the insulator 40 passes through the opening 119 of the first partition 110, and a part of the insulator 40 moves along the first guide path 116a. Moving along the first guide path 116a, the insulator 40 fills the second partition 120 through the communication holes 111b formed at the coupling part 111a of the lower plate 111 and the opening 129 formed at the second partition 120.

Also, the remaining part of the insulator 40 having passed through the opening 119 of the first partition 110 moves along the second guide paths 116b, and fills the space defined by the support parts 117a of the reinforcing frame 117 and the prefabricated insulator 115 through the supplementary filling holes 115a formed at the plurality of side surfaces of the front portion of the prefabricated insulator 115. As a result, the prefabricated insulator 115 and the insulator 40 completely fill the space between the lower plate 111 and the upper plate 113 of the first partition 110.

Figure 10:
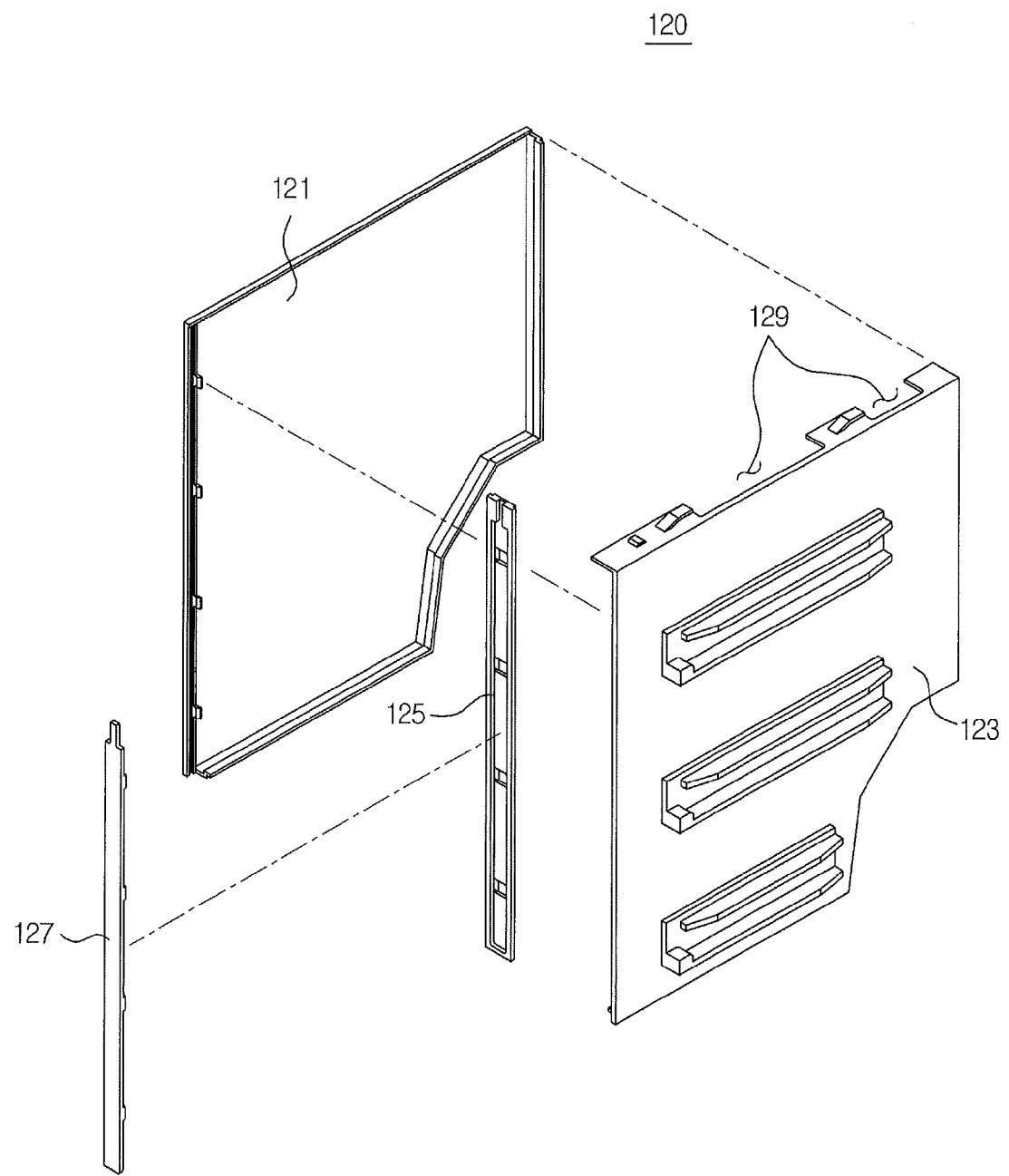
FIG. 10 is an exploded perspective view showing a second partition of the refrigerator according to an embodiment of the present disclosure.
Figure 11:
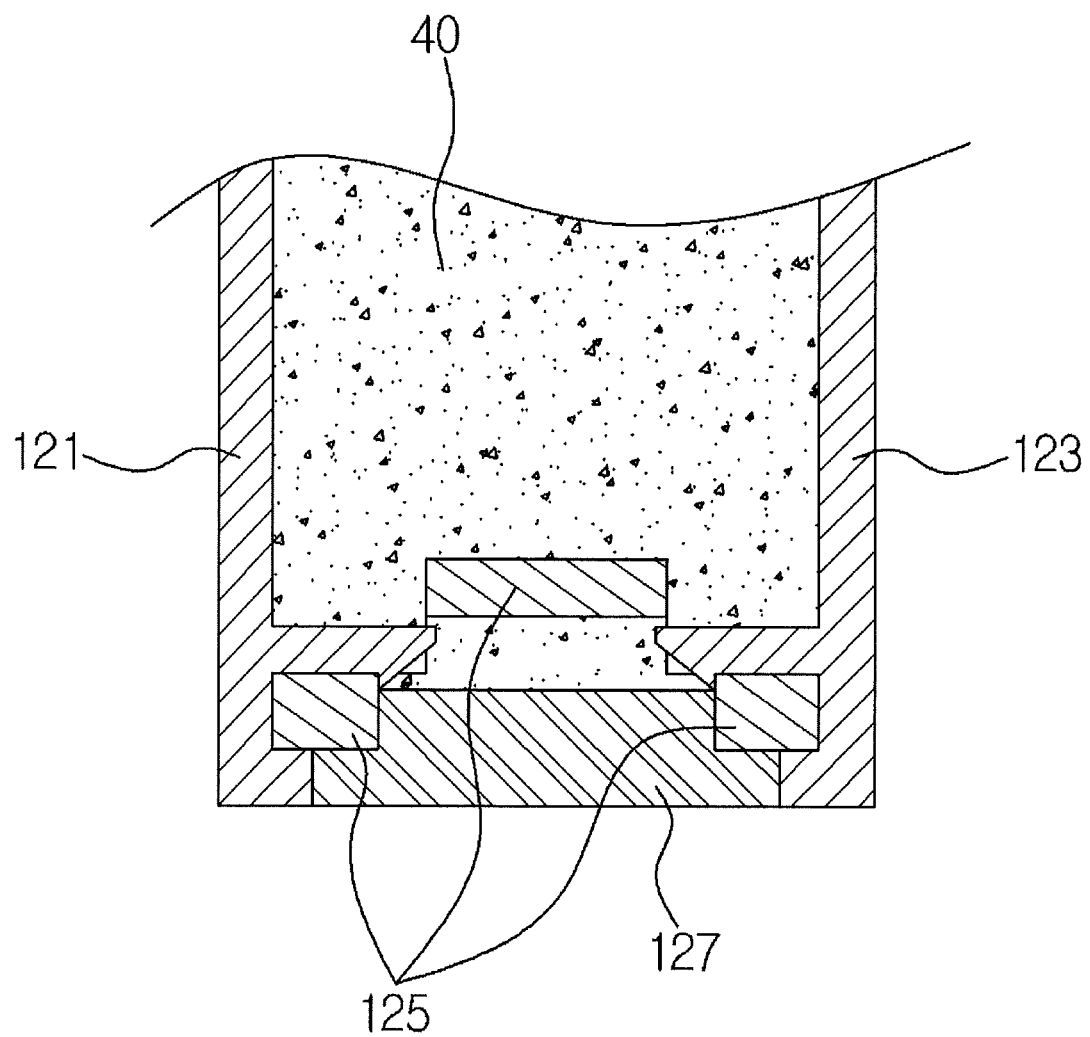
FIG. 11 is a sectional view schematically showing an adhered state of a left plate and a right plate of the second partition by the insulator in the refrigerator according to an embodiment of the present disclosure.

As shown in FIGS. 10 and 11, the second partition 120 includes a left plate 121, a right plate 123 coupled to the left plate 121, a hot pipe support part 125 coupled between the left plate 121 and the right plate 123 to support a hot pipe and maintain a gap between the left plate 121 and the right plate 123, and a cover 127 coupled to a front surface of the hot pipe support part 125.

As described above, the top surface of the second partition 120 is formed with the opening 129 communicating with the communication holes 111b formed at the coupling part 111a of the first partition 110, so that the insulator 40 may fill the second partition 120 through the communication holes 111b and the opening 129.

The left plate 121 and the right plate 123 of the second partition 120 are adhered to each other by the insulator 40 filling a space therebetween through the opening 129 without screw engagement.

The partitions 100 including the first partition 110 and the second partition 120 are manufactured separately from the main body 10 including the inner casing 20 and the outer casing 30, and are coupled to the inner casing 20. Since the partitions 100 are filled with the insulator 40 which fills the space between the inner casing 20 and outer casing 30, the insulator 40 may uniformly fill the inner space of the partitions 100.

The above-described constitution may enable the insulator 40 to uniformly fill the partitions 100 even though the partitions 100 are relatively long in large-capacity refrigerators.

Hereinafter, a manufacturing method of the refrigerator including the storage space and the partitions to divide the storage space into the plurality of storage chambers will be described with reference to FIGS. 2 through 11.

The partitions 100 and the main body 10 including the inner casing 20 and the outer casing 30 are manufactured separately from each other, and the partitions 100 are coupled to the coupling recesses 27 formed at the inner surface of the inner casing 20.

The insulator 40 fills the space between the coupling recesses 27 of the inner casing 20 and the partitions 100 through the second filling holes 29.

When the insulator 40 completely fills the space between the coupling recesses 27 of the inner casing 20 and the partitions 100, the insulator 40 fills the space between the inner casing 20 and the outer casing 30.

When the insulator 40 fills the space between the inner casing 20 and the outer casing 30, the insulator 40 also fills the partitions 100 through the first filling holes 28 of the inner casing 20.

The partitions 100 include the first partition 110 horizontally coupled to the inner casing 20 and the second partition 120 vertically coupled to the bottom of the first partition 110 and the inner casing 20, and the insulator 40 injected through the first filling holes 28 fills the first partition 110 through the opening 119 of the first partition 110.

A part of the insulator 40 supplied in the first partition 110 moves along the first guide path 116a formed at the prefabricated insulator 115. Moving along the first guide path 116a, the insulator 40 fills the second partition 120 through the communication holes 111b formed at the coupling part 111a of the lower plate 111 and the opening 129 formed at the second partition 120.

The remaining part of the insulator 40 having passed through the opening 119 of the first partition 110 moves along the second guide paths 116b, and fills the space defined by the support parts 117a of the reinforcing frame 117 and the prefabricated insulator 115 through the supplementary filling holes 115a formed at the plurality of side surfaces of the front portion of the prefabricated insulator 115. Accordingly, the prefabricated insulator 115 and the insulator 40 fill the space between the lower plate 111 and the upper plate 113 of the first partition 110. As a result, the space between the inner casing 20 and the outer casing 30 and the inner space of the partitions 100 are completely filled with the insulator 40.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A refrigerator comprising a storage space having an opened front portion and partitions coupled to an inner surface of the storage space to divide the storage space into a plurality of storage chambers, the refrigerator further comprising:

an inner casing having the storage space defined thereby, and including a plurality of side walls, a rear wall and a bottom wall respectively formed with coupling recesses to which the partitions are coupled to;

an outer casing coupled to the inner casing to define an appearance of the refrigerator; and an insulator disposed in a space between the inner casing and the outer casing, wherein the partitions include a first partition horizontally coupled to the plurality of side walls and the rear wall of the inner casing to divide the storage space into an upper storage chamber and a lower storage chamber, and a second partition vertically coupled to a bottom surface of the first partition and the bottom wall of the inner casing to divide the lower storage chamber into a left chamber and a right chamber, the insulator fills the first partition and fills the second partition, the second partition is connected with the first partition such that the insulator in the first partition flows into the second partition, the first partition includes a lower plate, an upper plate coupled to the lower plate, an insulating body disposed between the lower plate and the upper plate, and a reinforcing frame coupled between the lower plate and the upper plate to reinforce the first partition, the reinforcing frame includes a front portion and side portions which respectively extend from opposite ends of the front portion in a front to rear direction, the front portion is coupled to a front side of the first partition and the side portions are respectively coupled to opposite sides of the first partition, the insulating body includes cut-out portions provided on opposite sides thereof, so as to provide a space to accommodate respective side portions of the reinforcing frame between the upper plate and the lower plate, and the insulator is provided between the cut-out portions of the insulating body and the respective side portions of the reinforcing frame.

2. The refrigerator according to claim 1, wherein the coupling recesses include a first coupling recess formed at the plurality of side walls, a second coupling recess formed at the rear wall, and a third coupling recess formed at the bottom wall of the inner casing, and the first coupling recess and the second coupling recess have a length corresponding to a horizontal length of the plurality of side walls and the rear wall of the inner casing, respectively, and the third coupling recess has a length corresponding to a horizontal length of a portion of the bottom wall of the inner casing other than a portion occupied by a machine room cover.

3. The refrigerator according to claim 2, wherein the first partition includes a plurality of side surfaces which are slanted in a substantially inverted-trapezoidal shape, and the first coupling recess has a shape corresponding to the shape of the plurality of side surfaces of the first partition.

4. The refrigerator according to claim 3, wherein the first partition includes a rear surface which extends vertically, the second partition includes a bottom surface which extends horizontally, and the second coupling recess and the third coupling recess have a shape corresponding to the shape of the rear surface of the first partition and the bottom surface of the second partition, respectively.

5. The refrigerator according to claim 2, wherein the first coupling recess, the second coupling recess and the third coupling recess are formed with second filling holes, and a space formed between the first, second and third coupling recesses and the first partition is filled with the insulator.

6. The refrigerator according to claim 1, wherein the lower plate is provided with a coupling part to which the second partition is coupled, and the coupling part is formed with communication holes to communicate with the second partition, and the insulator in the first partition is continuously connected through the communication holes with the insulator in the second partition.

7. The refrigerator according to claim 6, wherein the insulating body is formed with guide paths at a bottom surface thereof, and the guide paths include a first guide path and second guide paths, the first guide path and the second guide paths are channels in which the insulator is disposed, and other portions of the insulator body are formed of a prefabricated insulator, wherein the first guide path is disposed to correspond to a location of the communication holes of the coupling part, the second guide paths are disposed to correspond to supplementary filling holes formed at the plurality of side surfaces of the front portion of the insulating body.

8. The refrigerator according to claim 7, wherein the first partition is formed with an opening at the rear surface thereof, and the opening communicates with the guide paths such that insulator in the opening of the first partition is continuously connected with insulator in the guide paths.

9. The refrigerator according to claim 8, wherein the second coupling recess formed at the inner casing is formed with first filling holes, and the first filling holes communicate with the first partition such that insulator in the first filling holes is continuously connected with insulator in the first partition.

10. The refrigerator according to claim 6, wherein the second partition includes a left plate, a right plate coupled to the left plate, a hot pipe support part coupled between the left plate and the right plate to support a hot pipe and maintain a gap between the left plate and the right plate, and a cover coupled to a front surface of the hot pipe support part.

11. The refrigerator according to claim 10, wherein the second partition is formed with an opening at a top surface thereof, and the opening of the second partition communicates with the communication holes so that the insulator in the first partition is continuously connected through the communication holes and the opening of the second partition with the insulator in the second partition.

12. The refrigerator according to claim 11, wherein the left plate and the right plate are adhered to each other by the insulator filled in a space between the left plate and the right plate.

13. A refrigerator comprising a main body, a storage space formed in the main body and having an opened front portion, and partitions coupled to an inner surface of the storage space to divide the storage space into a plurality of storage chambers, wherein the partitions include a first partition horizontally coupled to the storage space to divide the storage space into an upper storage chamber and a lower storage chamber, and a second partition vertically coupled to a bottom surface of the first partition and a bottom surface of the storage space to divide the lower storage chamber into a left chamber and a right chamber, and the first and second partitions are configured to be filled with an insulator so that when the first partition is filled with the insulator, a portion of the insulator in the first partition flows to the second partition to fill the second partition with the insulator, wherein the second partition is configured to receive the insulator via the first partition so that an inner space of the second partition is filled between a bottom surface of the second partition and an upper portion of the second partition with the insulator received via the first partition, the bottom surface of the second partition being adjacent to the bottom surface of the storage space, the first partition includes an insulating body disposed within the first partition, the insulating body is formed with at least one guide path at a bottom surface thereof, and the at least one guide path is configured to guide the insulator to fill at least one of the first partition and the second partition.

14. The refrigerator according to claim 13, wherein the main body includes an inner casing defining the storage space and an outer casing coupled to the inner casing to define an appearance of the refrigerator, and a space between the inner casing and the outer casing is configured to be filled with insulator.

15. The refrigerator according to claim 14, wherein the first partition includes a lower plate, an upper plate coupled to the lower plate, and a reinforcing frame coupled between the lower plate and the upper plate to reinforce the first partition, and the insulating body disposed between the lower plate and the upper plate.

16. The refrigerator according to claim 15, wherein the reinforcing frame is provided with support parts at both end portions thereof, which extend toward a space between the upper plate and the lower plate, and the insulating body includes a plurality of side surfaces at a front portion thereof, which have a shape corresponding to a shape of the support parts of the reinforcing frame so as to provide a space to accommodate the support parts between the upper plate and the lower plate.

17. The refrigerator according to claim 16, wherein the at least one guide path includes a first guide path and second guide paths, wherein the first guide path is configured to guide the insulator via communication holes formed in the first partition into the second partition to fill the second partition, when the first partition is filled with the insulator, and the second guide paths are configured to guide the insulator to supplementary filling holes formed at the plurality of side surfaces of the front portion of the insulating body so that the insulator fills the inner space of the first partition, when the first partition is filled with the insulator.

18. A manufacturing method of a refrigerator comprising a storage space having an opened front portion and partitions coupled to an inner surface of the storage space to divide the storage space into a plurality of storage chambers, the manufacturing method comprising:

preparing a main body including an inner casing and an outer casing separately from the partitions;

coupling the partitions to an inner surface of the inner casing;

filling a gap between the inner casing and the partitions with an insulator; and filling the partitions with the insulator by filling a space between the inner casing and the outer casing with the insulator, wherein the partitions include a first partition and a second partition connected to the first partition, wherein filling the partitions further comprises:

filling the first partition with the insulator; and filling the second partition by moving insulator from the first partition into the second partition so that an inner space of the second partition is filled between a bottom surface of the second partition and an upper portion of the second partition with the insulator moved from the first partition into the second partition, the bottom surface of the second partition being adjacent to a bottom surface of the storage space, wherein the first partition includes an insulating body disposed within the first partition, the insulating body is formed with at least one guide path at a bottom surface thereof, wherein filling the partitions further comprises:

guiding the insulator using the at least one guide path to fill at least one of the first partition and the second partition.

19. The manufacturing method of claim 18, wherein the at least one guide path includes a first guide path and second guide paths, wherein filling the partitions further comprises:

guiding the insulator using the first guide path to communication holes formed in the first partition so that the insulator moves into the second partition to fill the second partition, and guiding the insulator using the second guide paths to supplementary filling holes formed at a plurality of side surfaces of a front portion of the insulating body so that the insulator fills an inner space of the first partition.

20. The manufacturing method of claim 18, wherein filling the gap between the inner casing and the partitions with the insulator comprises:

filling a gap between a surface of a bottom wall of the inner casing and a surface of a bottom wall of the second partition by injecting insulator through a filling hole formed in the surface of the bottom wall of the inner casing.

* * * * *